(12) United States Patent
Hirose

(10) Patent No.: US 6,205,580 B1
(45) Date of Patent: Mar. 20, 2001

(54) METHOD FOR LOADING A PROGRAM

(75) Inventor: Takahiro Hirose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/149,453

(22) Filed: Sep. 9, 1998

(30) Foreign Application Priority Data

Sep. 12, 1997 (JP) .................................................. 9-248745

(51) Int. Cl.$^7$ .................................................. G06F 9/445
(52) U.S. Cl. .............................. 717/11; 717/11; 717/202
(58) Field of Search ........................... 711/10, 1, 202, 711/218; 717/12, 7, 11

(56) References Cited

U.S. PATENT DOCUMENTS

| | | | | |
|---|---|---|---|---|
| 4,330,822 | * | 5/1982 | Dodson | 717/10 |
| 5,136,709 | * | 8/1992 | Shirakabe et al. | 717/10 |
| 5,193,180 | * | 3/1993 | Hastings | 717/10 |
| 5,319,751 | * | 6/1994 | Garney | 711/115 |
| 5,708,811 | * | 1/1998 | Arendt et al. | 711/11 |
| 5,732,404 | * | 3/1998 | Johnson et al. | 711/2 |
| 5,764,987 | * | 6/1998 | Eidt et al. | 717/1 |
| 5,822,787 | * | 10/1998 | Zucker | 711/213 |
| 5,845,118 | * | 12/1998 | Gheith | 717/5 |
| 5,897,666 | * | 4/1999 | Mallick et al. | 711/217 |
| 5,956,757 | * | 9/1999 | Sun | 711/211 |
| 5,991,871 | * | 11/1999 | Zucker | 712/233 |
| 6,023,583 | * | 2/2000 | Honda | 717/9 |
| 6,076,134 | * | 6/2000 | Nagae | 711/11 |

FOREIGN PATENT DOCUMENTS

| | | |
|---|---|---|
| 0321000 | 6/1989 | (EP) . |
| 0489204 | 6/1992 | (EP) . |
| 9627158 | 9/1996 | (WO) . |

OTHER PUBLICATIONS

Heggy et al, "Architectural support for register allocation in the presence of aliasing", IEEE, pp 730–739, May 1990.*

Rau et al, "Pseudo randomly interleaved memory", IEEE, pp 74–83, Sep. 1991.*

Huck et al, "Architectural support for translation table management in large address space machines", IEEE, pp. 39–50, 1993.*

Waldspurger et al, "Register relocation: flexible contexts for multithreading", IEEE, pp. 120–130, May 1990.*

Yamada et al, "Data relocation and prefetching for programs with large data sets", ACM Micro pp 118–127, Mar. 1994.*

Ramsey, "Relocating machie instructions by currying", ACM PLDI, pp 226–236, Feb. 1996.*

Kessler, "Fast breakpoints: design and implementation", ACNM PLDI, pp 78–84, Mar. 1994.*

* cited by examiner

*Primary Examiner*—Mark R. Powell
*Assistant Examiner*—Anil Khatri
(74) *Attorney, Agent, or Firm*—Antonelli, Terry, Stout & Kraus, LLP

(57) ABSTRACT

A method of loading a program, wherein a relative address format file is transformed into a program format including a set of records each having an instruction and instruction relocation information, and wherein a loader receives the records one by one from a file of the above-mentioned program format, transforms the relative format program into an absolute address format program, and loads the absolute address format program on the memory.

30 Claims, 15 Drawing Sheets

METHOD FOR LOADING A PROGRAM

This application makes reference to, incorporates the same herein, and claims all benefits accruing under 35 U.S.C. § 119 from an application for "Method For Loading A Program," earlier filed in Japan on Sep. 12, 1997, Serial No.9-248745, a copy of which application is annexed hereto.

BACKGROUND OF THE INVENTION

The present invention relates to a method for loading a program, and more particularly to a method for generating an absolute address program from a relative address program and loading the absolute address program into memory. In addition, the present invention relates to a computer software product, such as a computer-readable medium, that contains the above-mentioned method for loading a program.

Two types of program object codes are absolute address codes and relative address codes. Absolute address codes are instructions that use absolute addresses when referring to data in memory or designating branch destinations. Programs that CPU's can execute directly are programs written using absolute addresses.

Relative address codes are instructions that designate memory addresses or branch destinations by using relative addresses such as symbolic addresses. Since CPU's cannot execute a program which is written using relative addresses, a relative address program is converted into an absolute address program through a loader prior to execution by the CPU. Unlike the absolute address programs, it is possible to specify storage locations for relative address programs when they are loaded into memory. Relative address format programs are currently used in many computers because it is possible to freely select storage locations in memory for the relative address format programs.

A relative address format program file includes a program proper and relocation information. Relocation information is information that is referred to by the loader when converting a relative address format program into an absolute address format program. This is outlined in Chapter 5, Loader, particularly in Sub-chapter 5.1.5, Relocating Loader, pp. 170–174 of System Program I by John J. Donovan, 1976, published by Nippon Computer Kyokai. The most common of the program file formats is COFF (Common Object File Format), a detailed description of which, is given in Chapter 4, File Formats a. Out (4), pp. 1–2 of AT&T UNIX SYSTEM V Programmers Reference Manual, 1990.

SUMMARY OF THE INVENTION

The loader for relocating a relative address format file reads the whole file, maps the file on a memory, and converts the relative address format file into an absolute address format file. A relative address format file, including relocation information, is often several times the size of an absolute address format file. Therefore, to enable the loader to operate, it is necessary to procure a working storage area several times larger than the whole program. If such a working storage area cannot be secured, the loader cannot load the program file, and the CPU cannot execute the program. It is an object of the present invention to provide a method for loading or executing a program, even if the system involved does not have a memory resource sufficient to map a relative address format file in the memory.

To achieve the above object, the method for loading a program according to an aspect of the present invention comprises the steps of:

(1) converting a conventional relative address format file into a file of a program format having a set of records, each made up of an instruction and instruction relocation information;

(2) having the loader fetch records one by one from a file of a program format generated in step (1), transform the file into an absolute address format, and locate or dispose the file on the memory;

(3) when the file of the program format generated according to step (1) cannot be stored in a single medium, dividing the file into smaller files and storing them in a plurality of media; and (4) having the loader sequentially load the smaller files, divided according to step (3), and locate them on the memory by rearranging them into a single program.

DESCRIPTION OF THE PREFERRED EMBODIMENTS

Figure 1:
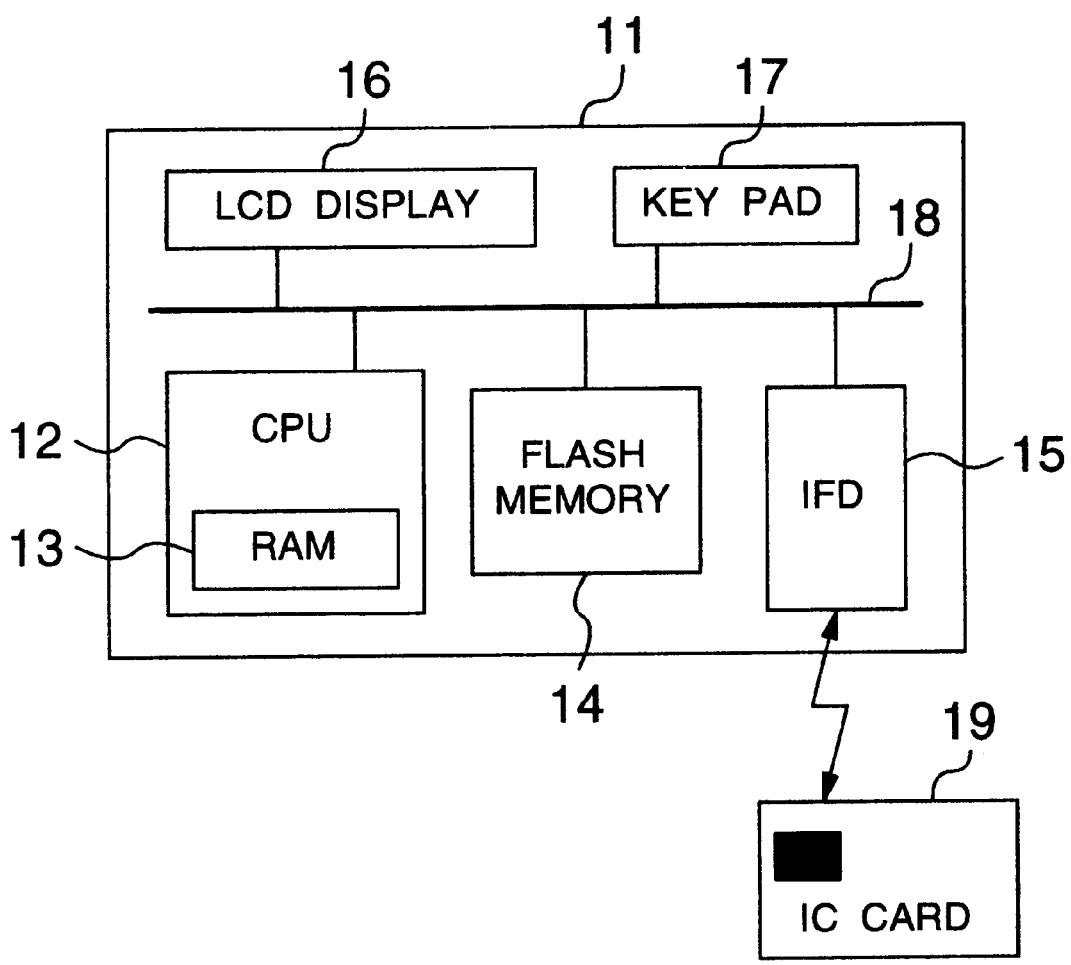
FIG. 1 is a block diagram showing an example of a system to which the present invention is applied.

FIG. 1 is a block diagram showing an example of a system to which the present invention is applied. Reference numeral 11 denotes a computer system or an IC card terminal system. An IC card 19 is inserted into an IC card reader (not shown). This terminal system 11 includes a microcomputer chip 12, a flash memory 14, a card interface (IFD) 15, a liquid crystal panel (LCP) display 16, and a key pad 17, and those component parts are interconnected by a common bus 18. The microcomputer chip 12 includes a RAM 13 as a working storage. The flash memory 14 contains an application program and data. The card interface (IFD) 15 communicates with the IC card. The liquid crystal panel 16 shows data such as the balance and menus. The key pad 17 accepts key inputs by the user. The user operates the keys to input instructions and, data, and in response to the instructions, the terminal communicates with the IC card and executes a necessary process. The result of the process is displayed on the liquid crystal panel (LCP) display 16.

Figure 2:
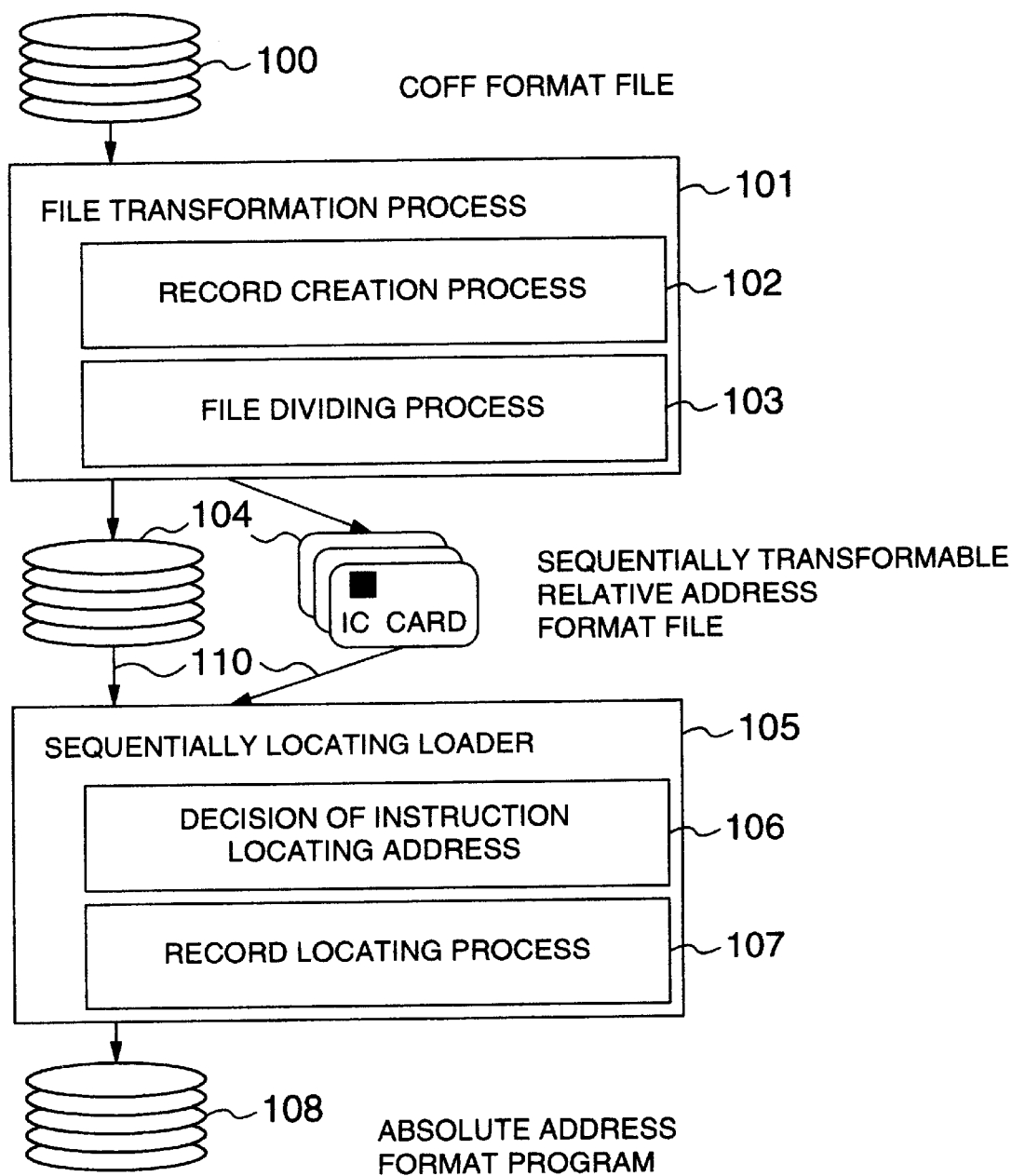
FIG. 2 is a diagram showing the procedure of a method of loading a program.

FIG. 2 is a diagram showing an example of process steps of the program loading method according to the present invention. Computers having an external storage device, such as a disk device or an IC card, to carry out the program loading method according to the present invention. A file transformation process 101 accepts a relative address format file 100 as an input, and outputs a sequentially transformable relative address format file 104. A sequentially transformable relative address format file 104 can be stored in a disk, an IC card, or any other recording medium. If the file cannot be fully accommodated in a single medium, the file may be divided and stored in a plurality of media.

A common type of relative address format files is COFF (Common Object File Format). The sequentially transformable relative address format file 104 is a file of a format which includes a set of records, each made up of an instruction and instruction relocation information. The file transformation process 101 first creates records by a record creation process 102. There are two record creation methods: a method of creating records by which one record is created for each piece of relocation information and a method of creating records by which one record is created for each instruction. The file transformation process 101 collects the created records and outputs them to a file. If the file cannot be stored in a single medium, the file division process 103 divides the file into a plurality of operation units, in other words, files. When an IC card is used to store a file, since its recording capacity is limited, it often becomes necessary to divide the file.

A sequentially relocating loader 105 reads a sequentially transformable relative address format file 104 (110), and outputs an absolute address format program. The absolute address format program can be directly located in memory and executed. The program may be written directly in memory or may be stored in a file. If there are a number of input files, the sequentially relocating loader performs a sequential loading process, thereby transforming those files into a single absolute address format program and outputting the program. The sequentially relocating loader 105 first reads the file header and decides instruction relocation addresses (106). On the basis of the addresses, the loader 105 executes a record relocation process (107), and generates an absolute address format program 108.

Figure 3:
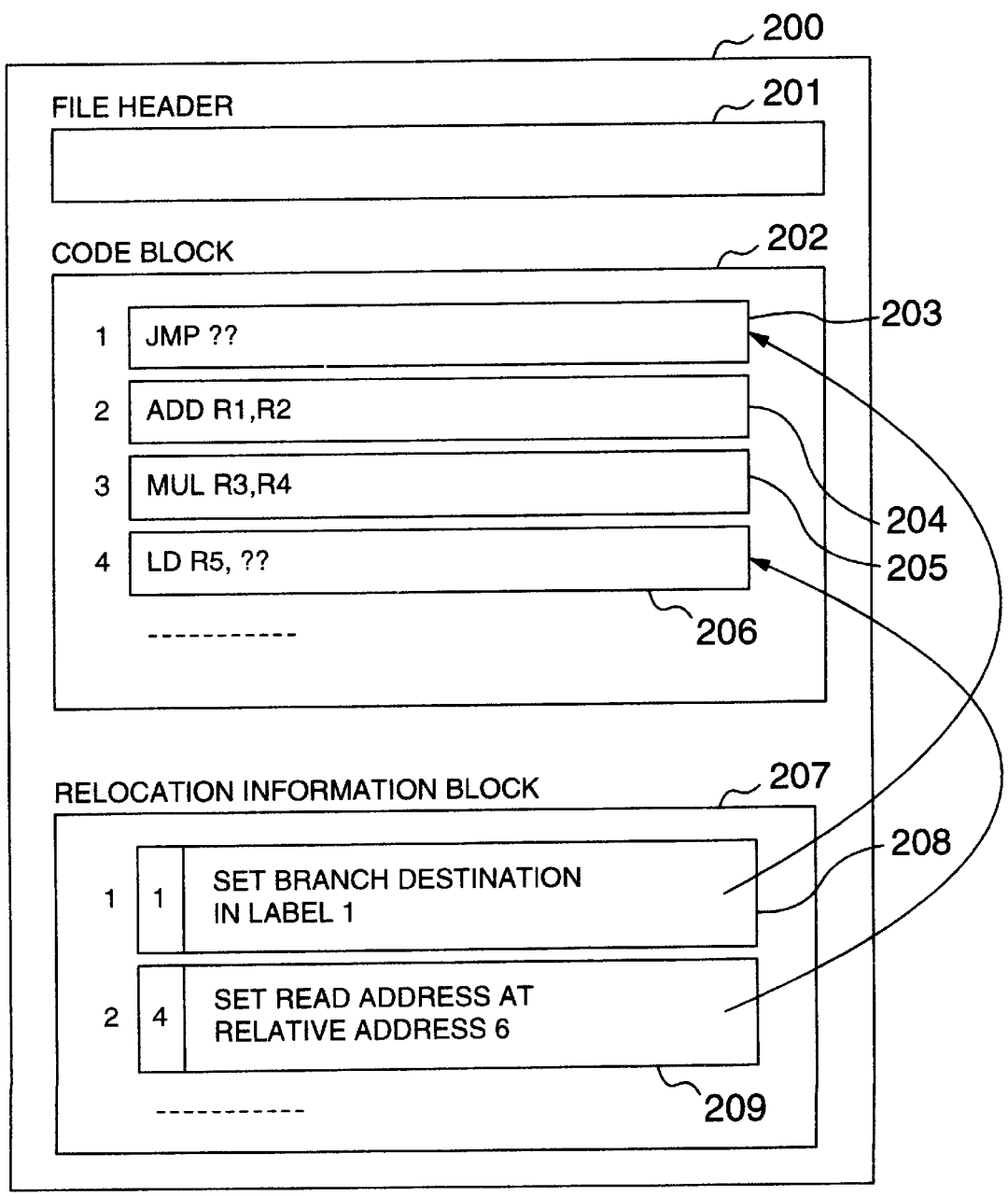
FIG. 3 is a diagram showing a relative address format file.

FIG. 3 shows an example of an object file of relative address format. This example is for purposes of illustration and is shown in a simpler form than general COFF format files. A relative address format file 200 roughly consists of three major sections: a file header 201, a code block or field 202, and a relocation information block or field 207. Information written in the file header 201 is information on the attributes, the layout of areas and the like of the file. The code block 202 shows a string of instructions 203, 204, 205 and 206. Some instructions are subject to the relocation process, and others are not subject to the relocation process. Instructions 204 and 205 are non-relocation instructions. The instructions written in the code block are used as absolute address instructions as they are. Instructions 203 and 206 are subject to relocation and are transformed into absolute address instructions during loading according to relocation information 208 and 209.

There are two possible file formats of the sequentially transformable relative address format. First there will be discribed a method of creating records by which one record is created for each instruction; then a method of creating records by which one record is created for each piece of relocation information will be explained.

Figure 4:
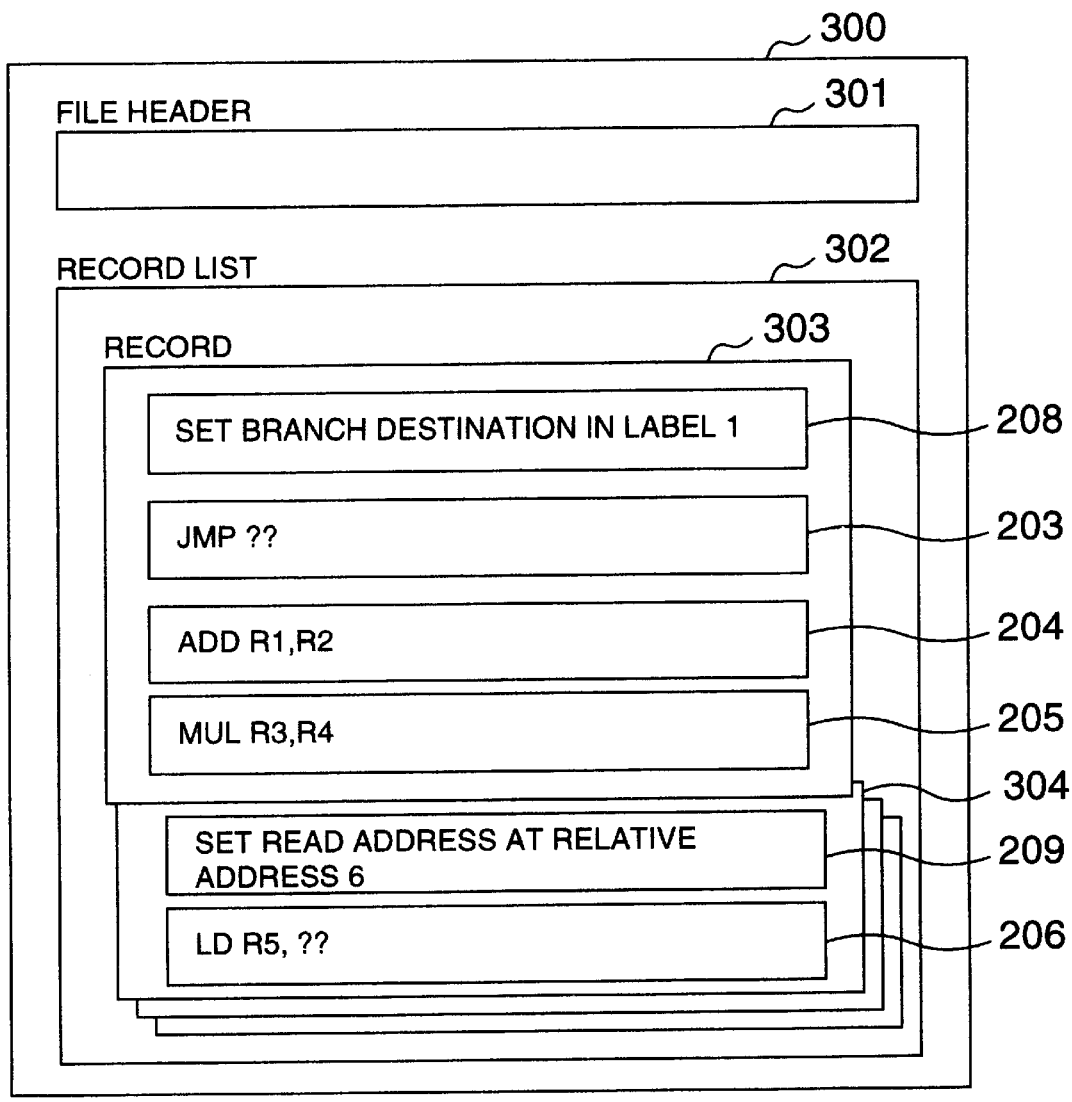
FIG. 4 is a diagram showing a sequentially transformable relative address format file in which one record is created for each piece of relocation information.

FIG. 4 shows an example of a sequentially transformable relative address format file 300, in which one record is created for each piece of relocation information. A file 300 consists of a file header 301 and a record list 302. In the file header 301, file identification information and an offset for locating the record are written. The record list 302 has a plurality of records 303, 304 and so on, arranged sequentially.

Records 303, 304 each includes relocation information, a corresponding instruction to be relocated, and an instruction involving no relocation. Each record always includes a piece of relocation information and an instruction to be relocated. However, the record may not include an instruction involving no relocation or may include a plurality of instructions involving no relocation. The record 303 includes relocation information 208, an instruction to be relocated 203, and two instructions involving no relocation 204, 205. On the other hand, the record 304 includes relocation information 209 and an instruction to be relocated 206, but no instruction involving no relocation.

Because each record holds therein relocation information and an instruction to be relocated, the moment the loader reads a record, it can locate or dispose of the record immediately.

Figure 5:
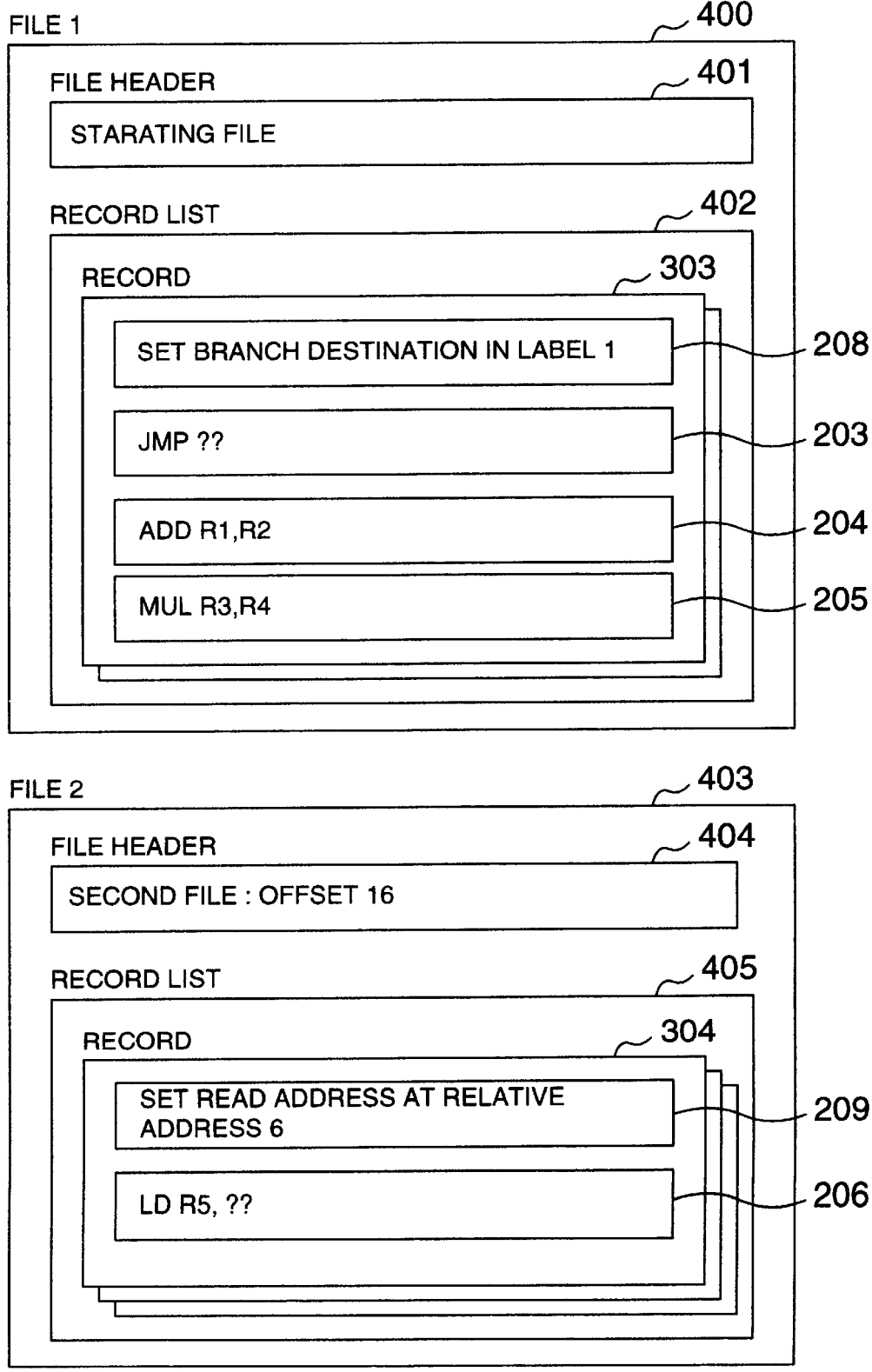
FIG. 5 is a diagram showing an example of dividing a sequentially transformable relative address format file in which records are created one record for each piece of relocation information.

FIG. 5 shows examples of dividing a file into sequentially transformable relative address format files 400, 403, in which one record is created for each piece of relocation information. A sequentially transformable relative address format file can be divided into an arbitrary number of files, one file for each record list. The record list 302 in FIG. 4 is divided into a record list 402 and a record list 403, those lists 402 and 403 being respectively the components of a file 400 (file 1) and a file 403 (file 2).

Each file header includes file identification data and an offset in the code block. In a file header 401, however, only file identification information is written. Since the file 400 is the starting file, the instructions need to be located at the leading end of the code block. In a file header 404, file identification information and a code offset are written. In the file 403, which is the second file, the instructions need to be located in memory with a space for instructions of the start file left empty. From the header 404, it is understood that the instructions need to be located starting at a point 16 bytes from the leading end of the code block.

Figure 6:
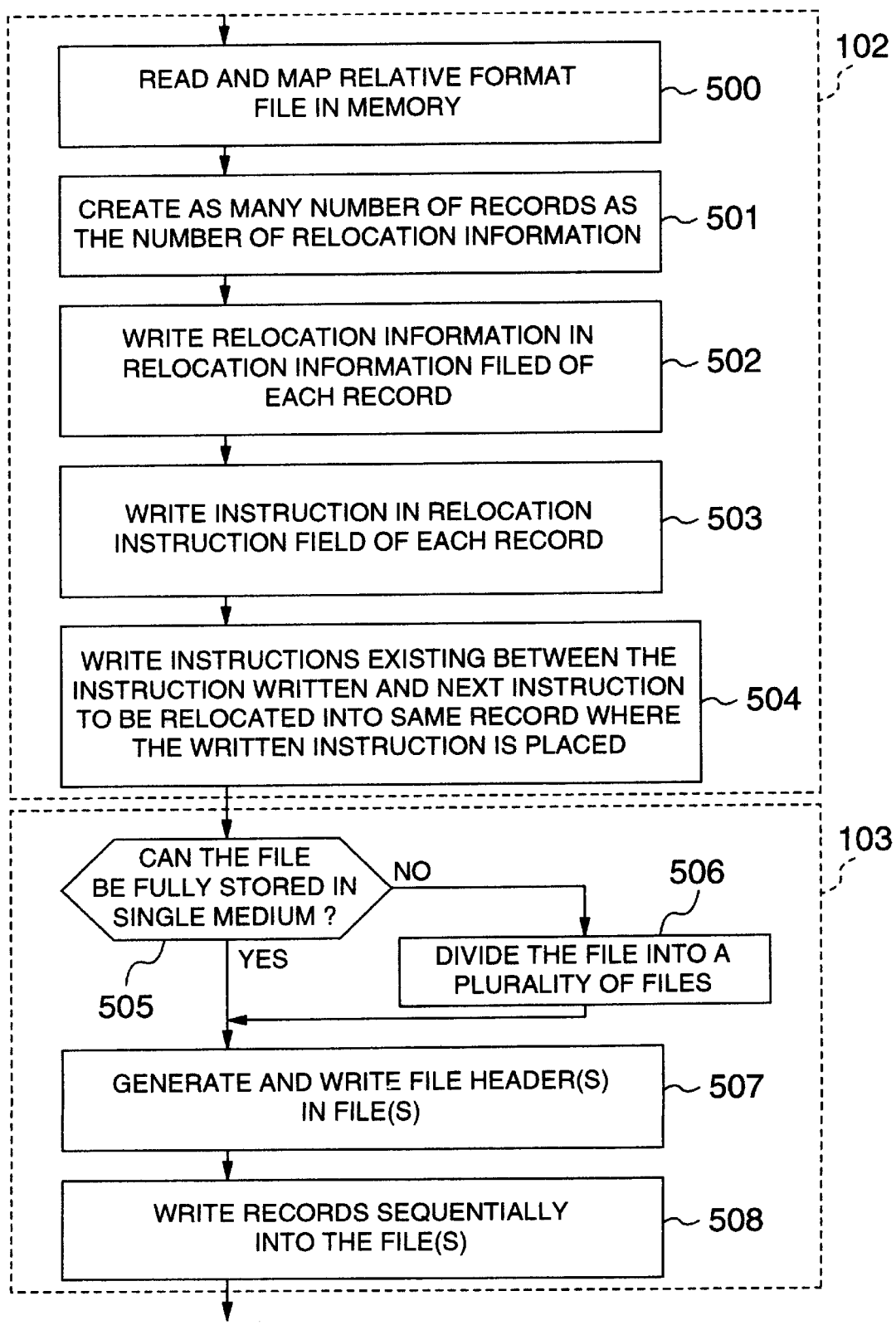
FIG. 6 is a flowchart showing a file transformation procedure for creating a sequentially transformable relative address format file in which one record is created for each piece of relocation information or is a medium portion which stores therein a program for implementing the flowchart.

FIG. 6 shows a medium portion 101 that stores therein a program for implementing a procedure of the file transformation process for creating a sequentially transformable relative address format file, in which one record is created for each piece of relocation information. Steps 500 to 504 correspond to the record creation process 102 in FIG. 2. Steps 505 to 507 correspond to the file division process in FIG. 2. First, at Step 500, a relative address format file is read and loaded into the flash memory 14. Then, at Step 501, a relocation information block 207 is inspected to check the number of entries of relocation information. As many records of sequentially transformable relative address format are created as the number of entries. At Step 502, the entry in the relocation information field in each record is scanned, and relocation information is written in the record of the sequentially transformable relative address format.

Subsequently, the instructions in the code block 202 are written in the records. At this time, there is a difference in handling between the instructions to be relocated and the instructions involving no relocation. At Step 503, the instructions to be relocated are written in records, one instruction in each record. At Step 504, the instructions involving no relocation, which are disposed of after the written instruction to be located and before the next instruction to be relocated, are written in the same record where the immediately preceding instruction to be relocated has been written. Consequently, in some cases, a plurality of instructions involving no relocation are written in a record; and, in other cases, no instruction involving no relocation is written in a record.

At Step 505, the size of the resulting sequentially transformable relative address format file is estimated. Since the size of the file header is fixed, the size of the whole file can be estimated from the size of the storage area of the memory that the records occupy. If the size of the file is less than the storage capacity of the recording medium, the file is treated as a single file. When the file is larger than the storage capacity of the recording medium, the record list is divided into a number of files at Step 508. At Step 507, an instruction-offset value is calculated for each file if necessary, and file headers are generated. Finally, at Step 508, records are written sequentially in the files.

For confidential programs, at Step 507, a condition for access permission is written in the file header. At Step 508, the records are first encrypted and then written in a file. Records may be encrypted separately, or the whole record list may be encrypted collectively. The general configuration for setting a condition for access permission or for performing an encryption process will be described later with reference to FIG. 14.

Figure 7:
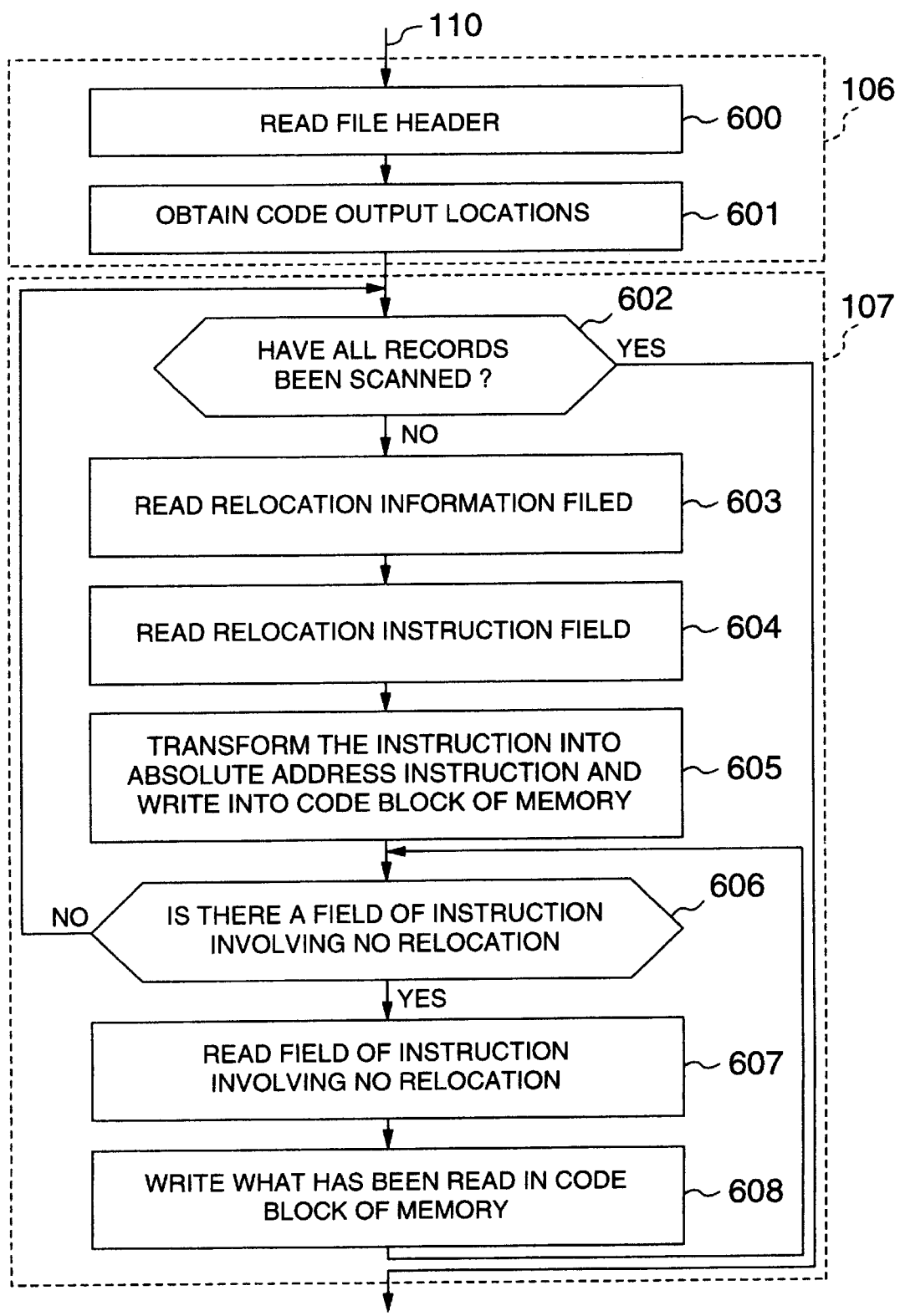
FIG. 7 is a flowchart showing a loader procedure for locating a sequentially transformable format file in which one record is created for each piece of relocation information or is a medium portion which stores therein a program for implementing the flowchart.

FIG. 7 shows a medium portion 105 that stores therein a program for implementing a procedure of the sequentially relocating loader for locating a sequentially transformable relative address format file, in which one record is created for each piece of relocation information. Steps 600 and 601 correspond to the instruction relocation address decision 106 in FIG. 2, and Steps 602 to 608 correspond to the record relocation process 107 in FIG. 2. At Step 600, a sequentially relocatable relative address format file header is read. At Step 601, the attributes of the file are referred to. If access permission information has been added to the file header, the access permission condition is checked; and, if the permission condition is satisfied, the process continues. After this, a check is made to see if the file has been divided. If the file is still a single file, the process continues. If the file has been divided into a plurality of files, the instruction offsets of those files are checked. In the subsequent record relocation process 107, the instructions are relocated to locations that are separated by offset values from the reference point in the code block. This makes it possible to read the divided files into memory in arbitrary sequence.

At Step 602, the records are scanned sequentially. If the records have been encrypted, they are decrypted here. When all the records have been scanned, the record relocation process is completed. At Step 603, the relocation information of the record is fetched. Then, at Step 604, the instruction to be relocated is fetched. At Step 605, from this instruction and the relocation information that has been previously read, an absolute address instruction is generated, and the generated instruction is located or disposed in the code block in the memory. Then, at Step 606, a check is made to see if there is any instruction involving no relocation. If there is no instruction involving no relocation in the record, the process proceeds to the next record. However, if an instruction involving no relocation is included in the record, the instruction is written in the code block in the memory by performing Steps 607 and 608. After the instruction has been written in the memory, the process moves on to the next record.

After the process is finished, the relocation information in the code block in the memory is checked. If the file remains a single file, the instructions have been relocated in all the code blocks, and the system is notified that the program ready for execution is. However, if a file was divided into smaller files, the instructions have not necessarily been relocated in all the code blocks. After it has been confirmed that all instructions were relocated, notification that the program is in ready condition is given to the managing program of the system.

Figure 8:
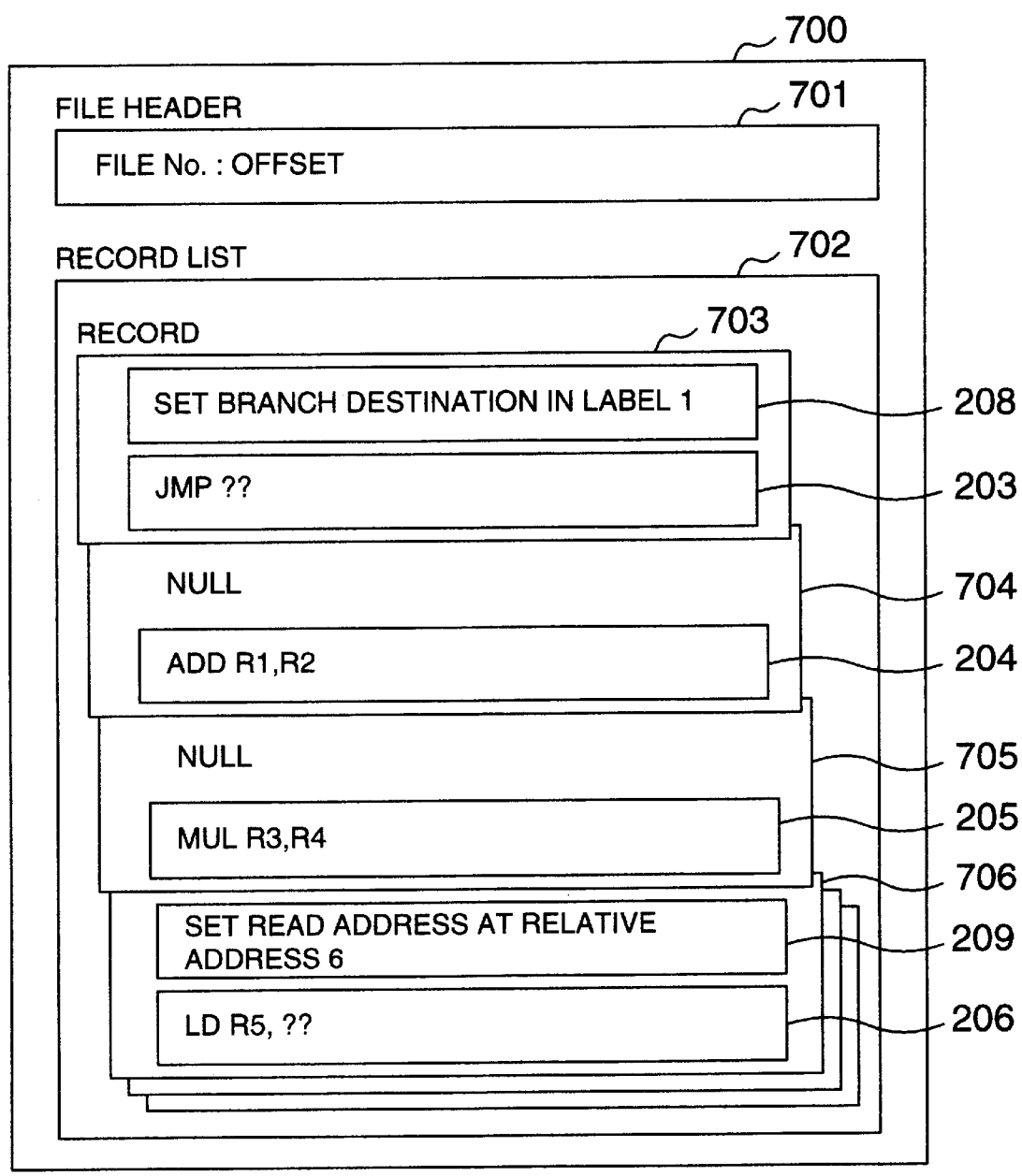
FIG. 8 is a diagram showing a sequentially transformable relative address format file in which one record is created for each instruction.

A file 700 in FIG. 8 is an example of a sequentially transformable relative address format file, in which one record is created for each instruction. The file 700 includes a file header 701 and a record list 702. In the file header 701, file identification information and an offset for locating the record are written. The record list 702 is a list of records 703, 704, 705, 706 and so on, arranged sequentially.

A record includes relocation information and an instruction. If the instruction is an instruction to be relocated, the record includes relocation information and an instruction. On the other hand, if the instruction is an instruction involving no relocation, the relocation information becomes null. In the records 703 and 706, because the instructions 203 and 206 are instructions to be relocated, they each have relocation information 208 and 209. In the records 704 and 705, because the instructions 204 and 205 are instructions involving no relocation, there is no relocation information for those instructions.

Each record holds therein information necessary for relocation. Therefore, on reading a record, the loader can immediately locate or dispose of the instruction.

Figure 9:
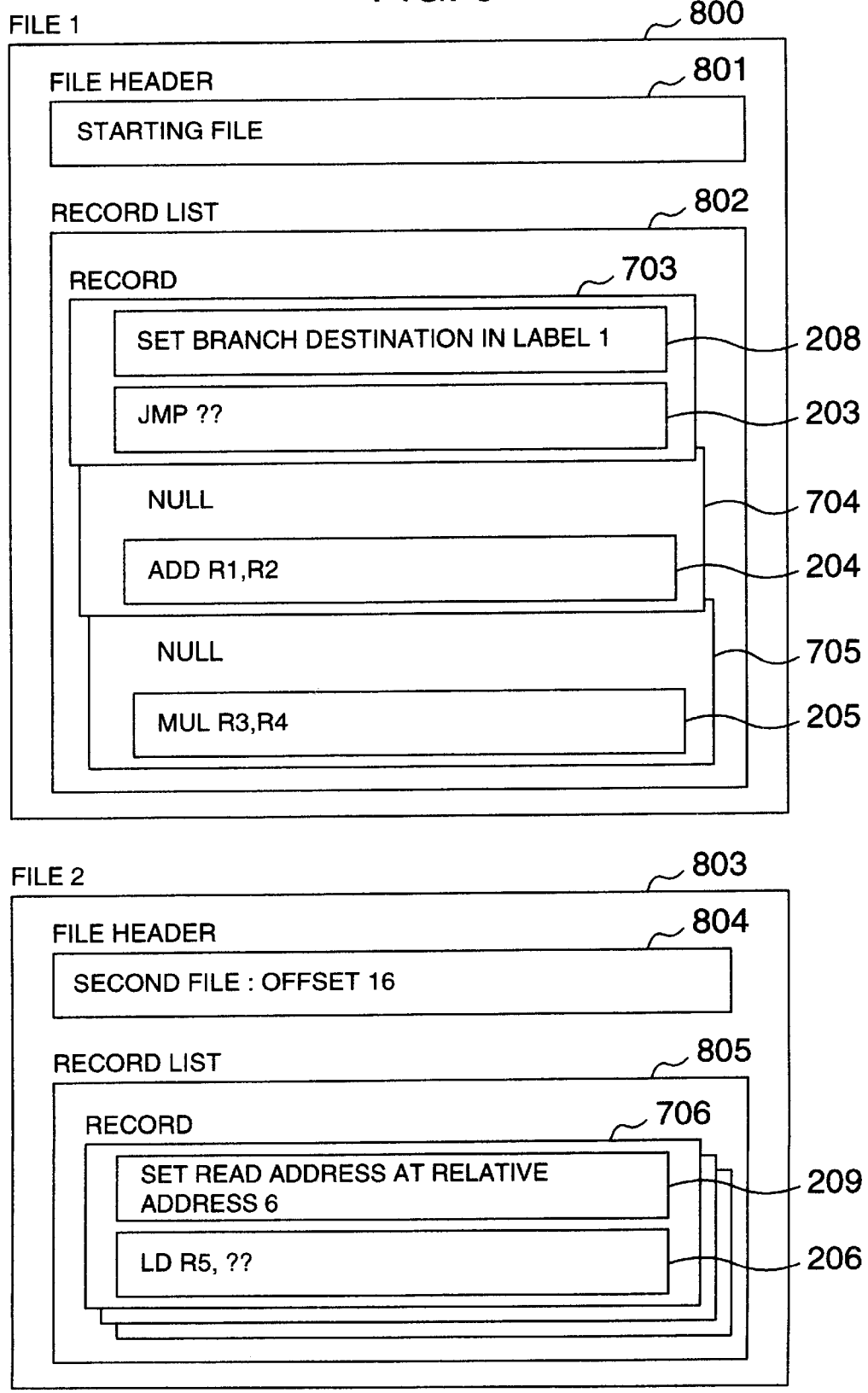
FIG. 9 is a diagram showing an example of division of a sequentially transformable relative address format file in which one record is created for each instruction.

FIG. 9 shows an example of division of the sequentially transformable relative address format file of FIG. 8 into files 800 and 803, in which one record is created for each instruction. The sequentially transformable relative address format file can be divided into an arbitrary number of files, one file for each record list. The record list 702 in FIG. 8 is divided into a record list 802 and a record list 805 in FIG. 9, the record lists 802 and 805 being respectively the components of a file 800 (file 1) and a file 802 (file 2).

Each file header stores file identification information and a code offset in the code block. In a file header 801, however, only file identification information is written. Because the file 800 is the starting file, the instructions are to be located at the beginning of the code block. In a file header 804, file identification information and a code offset are written. Since the file 803 is the second file, when locating the instruction of the second file 403, it is necessary to leave a space for the instructions of the first file. From the file header 804, it is understood that the instructions need to be located starting at a point 16 bytes from the leading end of the code block.

Figure 10:
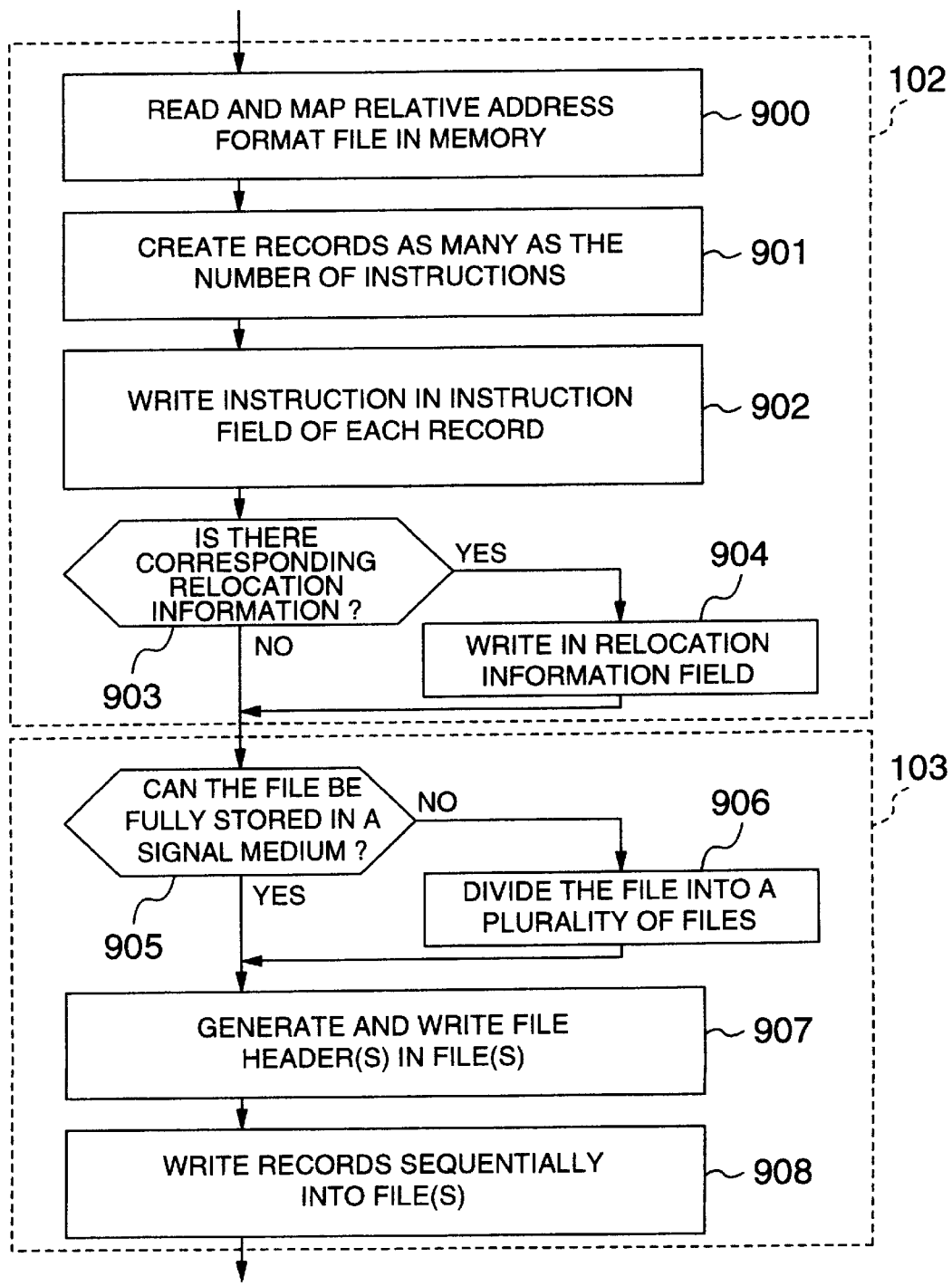
FIG. 10 is a flowchart showing a file transformation procedure for creating a sequentially transformable relative address format file in which one record is created for each instruction or is a medium portion which stores therein a program for implementing the flowchart.

FIG. 10 shows a medium portion 101 that stores therein a program for implementing a procedure of the file transformation process for creating a sequentially transformable relative address format file, in which records are created at the rate of one record for each instruction. Steps 900 to 904 correspond to the record creation process 102 of FIG. 2. Steps 905 to 908 correspond to the file division process 103 of FIG. 1. At Step 900, a relative address format file is read and loaded into the flash memory 14. At Step 901, the code block is checked, the number of instructions is checked, and as many records as the number of instructions are created. At Step 902, an instruction is entered in the created record. At Step 903, the entry in the relocation information field is scanned to see if there is relocation information corresponding to the instruction. If there is no relocation information corresponding to the instruction, it follows that the instruction is an instruction involving no relocation. Therefore, the field for relocation information is left empty. If there is relocation information corresponding to that instruction, it follows that the instruction is an instruction to be relocated. At Step 904, relocation information is written in the relocation information field of the record.

When all instructions have been written in the record, the size of the sequentially transformable relative address format file is estimated at Step 905. Since the size of the file header is fixed, the size of the whole file can be estimated by finding that storage size of memory which is occupied by the records. If the file size is within the storage size of a medium in which the file is written, the file is treated as a single file. If the file cannot be fully stored in the medium, however, the file is divided into a plurality of smaller files at Step 906. The instruction-offset value for each file is calculated, and file headers are created at Step 907. Finally, the records are written in the files at Step 908.

For confidential programs, at Step 907, a condition for access permission is written in the file header. At Step 908, the records are first encrypted and then written in the file. Records may be encrypted individually or the whole record list may be encrypted collectively. The general configuration for setting a condition for access permission or for performing an encryption process will be is described with reference to FIG. 1.

Figure 11:
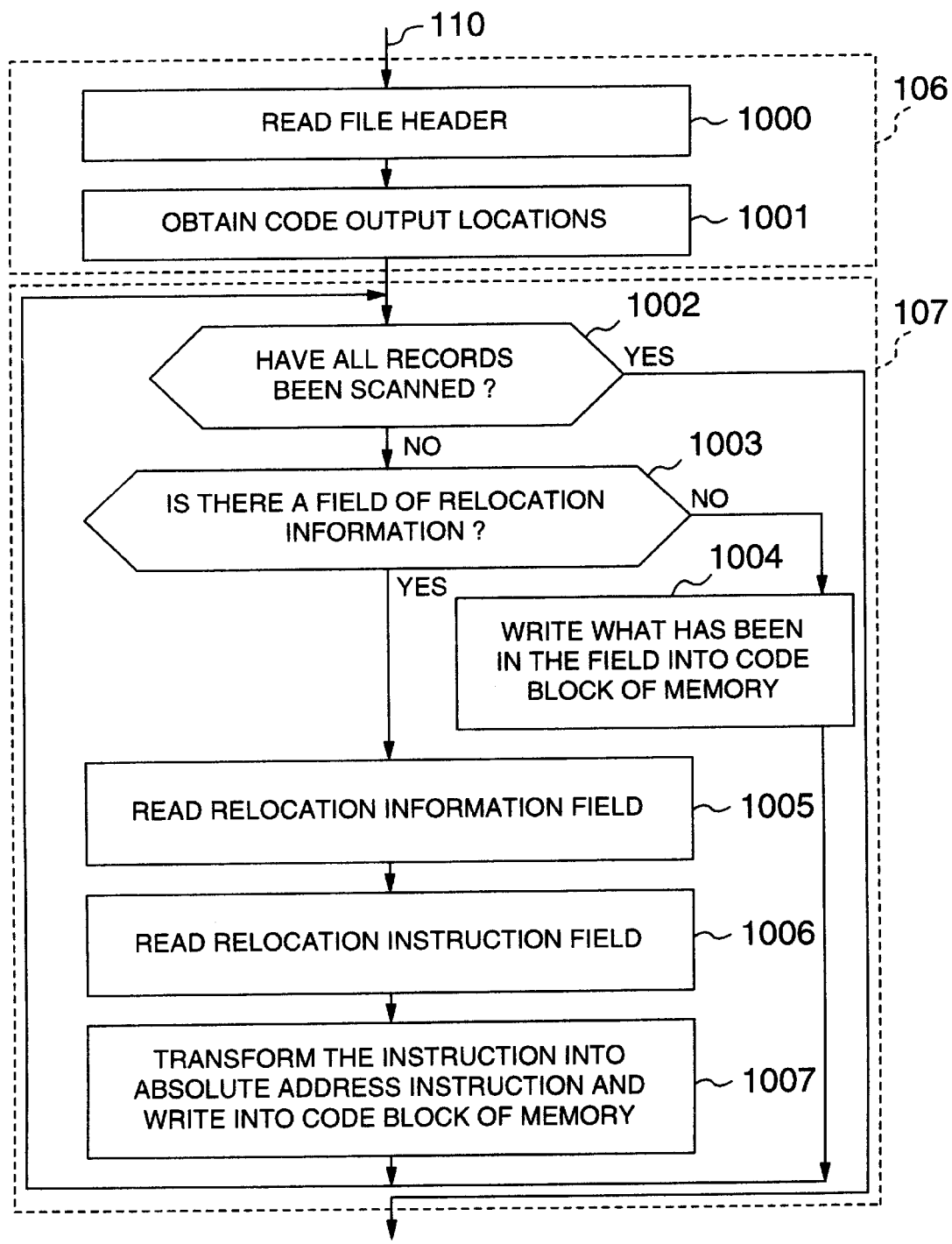
FIG. 11 is a flowchart showing a loader procedure for locating a sequentially transformable relative address format file in which one record is created for each instruction or is a medium portion which stores therein a program for implementing the flowchart.

FIG. 11 shows a medium portion 105 that stores therein a program for implementing the procedure of the sequentially relocating loader for relocating a sequentially transformable relative address format file, in which one record is created for each instruction. Steps 1000 and 1001 correspond to the instruction relocation address decision 106 in FIG. 2, and Steps 1002 to 1007 correspond to the record relocation process 107 in FIG. 2. At Step 1000, the file header is read. At Step 1001, the attribute s of the file are referred to. If access permission information is added in the file header, the access permission condition is checked. If the condition is satisfied, the process continues. Then the file is checked to see if it has been divided. If the file remains a single file, the process continues. If a file has been divided into a plurality of smaller files, the instruction offsets of those files are checked. In the subsequent process 107, instructions are located at locations that are separated by offset values from the reference point in the code block.

Subsequently, at Step 1002, records are scanned sequentially. If the records, have been encrypted, they are decrypted here. When all records have been scanned, the process 107 is completed. At Step 1003, the record is inspected to see if relocation information has been written. If there is no relocation information, the instruction is written as is in the code block at Step 1003. If there is relocation information, the relocation information is read at Step 1005, and an instruction to be relocated is read at Step 1006. At Step 1007, from the relocation information and the instruction to be relocated, an instruction at an absolute address is generated, and the generated instruction is written in the code block in the memory.

After all records have gone through the above the process, the relocation information in the code block in the memory is checked. If the file remains a single file, the instructions must have been relocated to absolute addresses in all of code blocks. Notification that the program is now in executable condition is given to the manager of the system. If the file has been divided into smaller files, the instructions have not necessarily been relocated in all the code blocks. When it has been confirmed that all files are loaded and the instructions are relocated in all of the code blocks, notification that the program is ready for execution is given the manager of the system.

Figure 12:
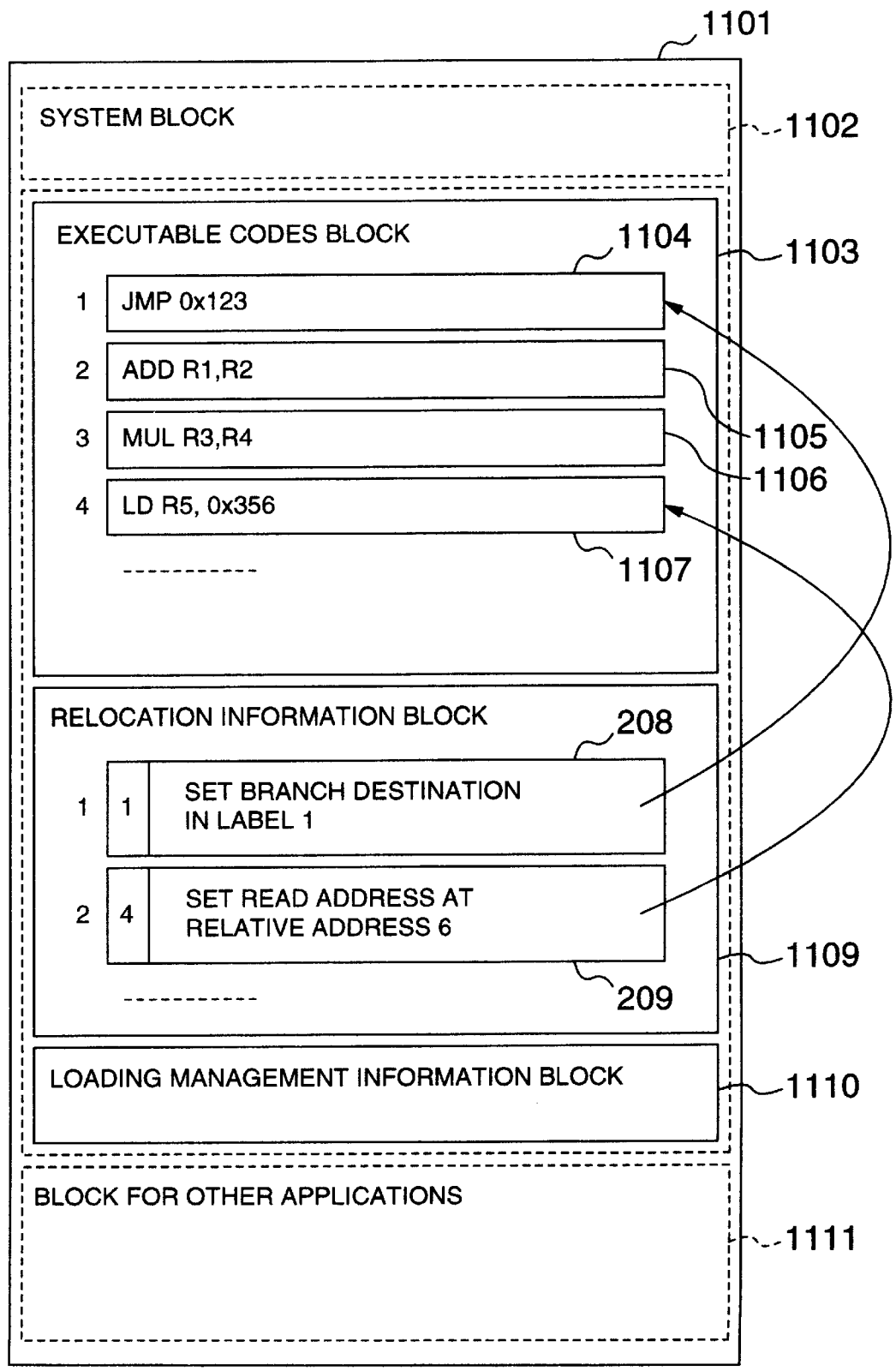
FIG. 12 is a diagram showing a memory image of executable codes with relocation information on the system.

FIG. 12 is a diagram showing a memory image of executable codes with relocation information. The whole program has been transformed into an absolute address format ready for operation and loaded on the memory. Once the program has been transformed into an absolute address format, the relocation information is lost, so that the relocation process cannot be performed further. In anticipation of future relocation, relocation information must be stored in another storage area.

An area 1101 shows a memory image on the system. An area 1103 denotes a code block of an executable application program. Areas 1104, 1105, 1106 and 1107 denote instructions in the code block. An area 1109 denotes a storage block for storing relocation information for the instructions. The instructions 208 and 209 constitute relocation information. An area 2220 denotes a storage block for storing information other than relocation information. The areas 1109 and 1110 are not required for execution of the instructions, but they are used when the program in the code block 1103 is relocated and loaded to another system.

An area 1102 is a system block, and an area 1111 is a block for storing another application program.

Figure 13:
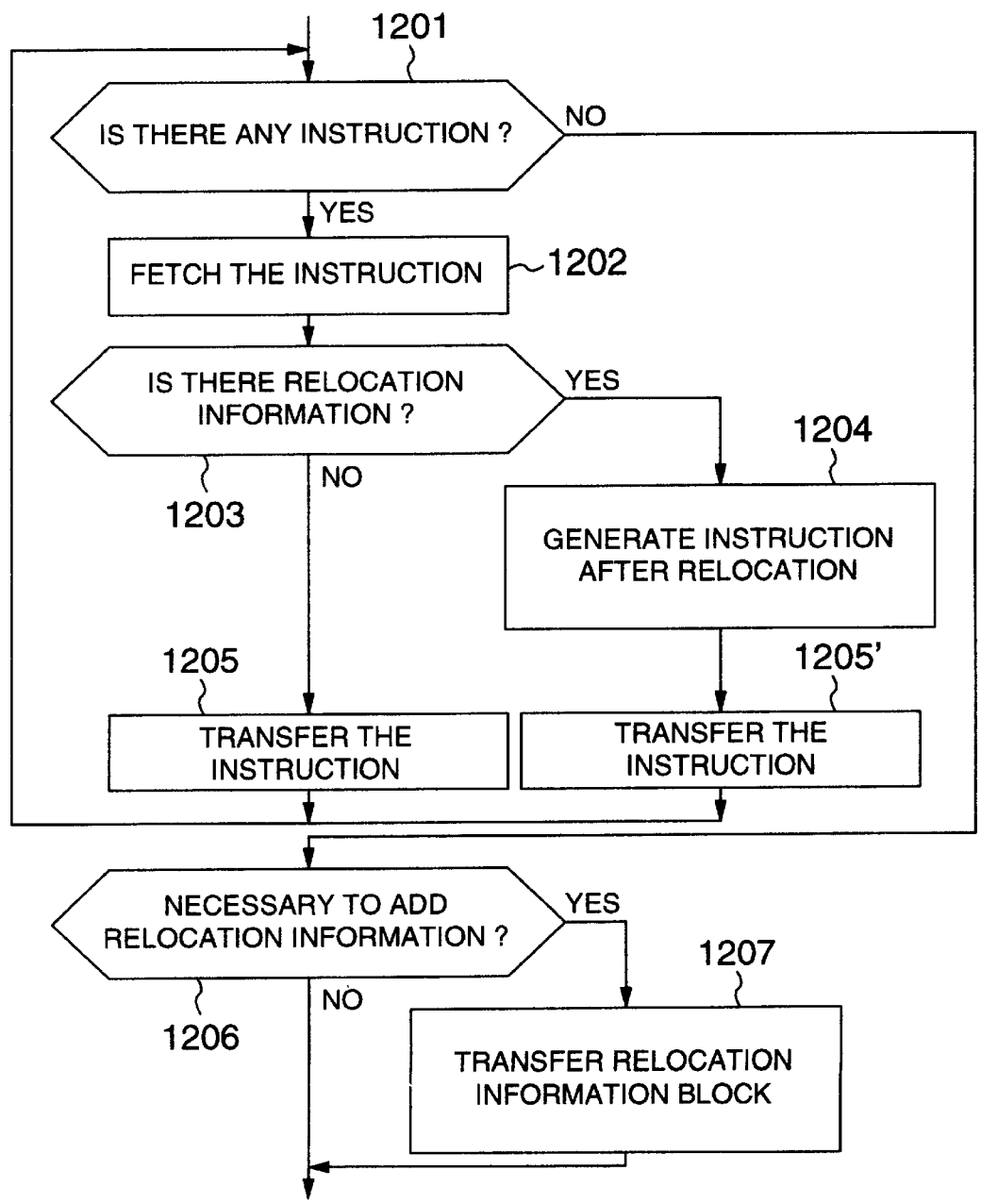
FIG. 13 is a flowchart showing a procedure of loading a program into another system from the memory image of executable codes with relocation information or is a medium portion which stores therein a program for implementing the flowchart.

FIG. 13 shows a medium portion that stores therein a program for implementing a procedure for loading to another terminal a program from the memory image of executable codes added with relocation information shown in FIG. 12. At Step 1201, the code block in the memory of the sending terminal is checked. If there is no instruction, the procedure is terminated. If there is an instruction, the instruction is fetched at Step 1202, and the relocation information block is checked for relocation information corresponding to the instruction at Step 1203. If there is no relocation information, at Step 1205, the instruction is transferred to the terminal to which the program is loaded. If there is relocation information, at Step 1204, the relocation process is performed. After the process is finished, the instruction is transferred to the destination terminal at Step 1205'.

After the instruction has been transferred, the process proceeds to Step 1206. When necessary, a command is issued directing that the program, which has been loaded to the one other terminal, be loaded to yet another terminal. If a command to load the program to another terminal is not issued, the process is terminated. When the program is loaded to yet another terminal, relocation information is required. At Step 1207, relocation information is transferred to the terminal as the loading destination.

Figure 14:
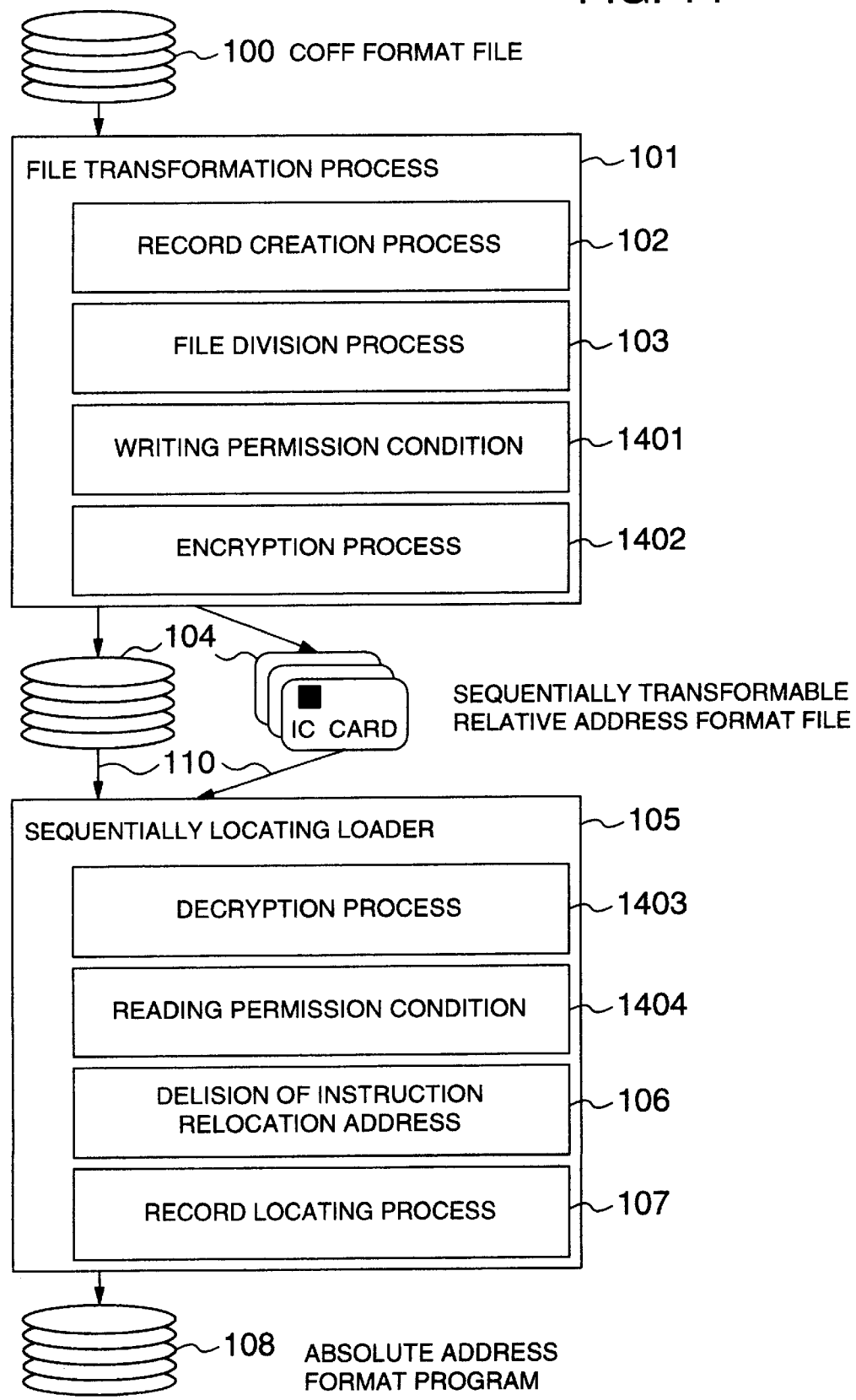
FIG. 14 is a diagram illustrating the method of loading a program, including the steps of setting a condition for access permission and for performing an encryption process.

FIG. 14 shows a general configuration of a procedure including the processes of setting a condition for access permission and for performing an encryption process. These processes are preceded by a common basic procedure. After main steps of file transformation are finished, a permission condition writing process 1401 is first conducted, followed by an encryption process 1402.

If a permission condition has been set or encryption has been done in a sequentially transformable relative address format file 104, other processes must precede the main relocation process. More specifically, a decryption process 1403 is executed to make the contents of the file readable. Then, a permission condition reading process 1404 is executed to confirm the permission condition. If the permission condition is satisfied, the process continues. If not, the process is terminated. From the sequentially relocating loader on, the same basic procedure is performed.

Figure 15:
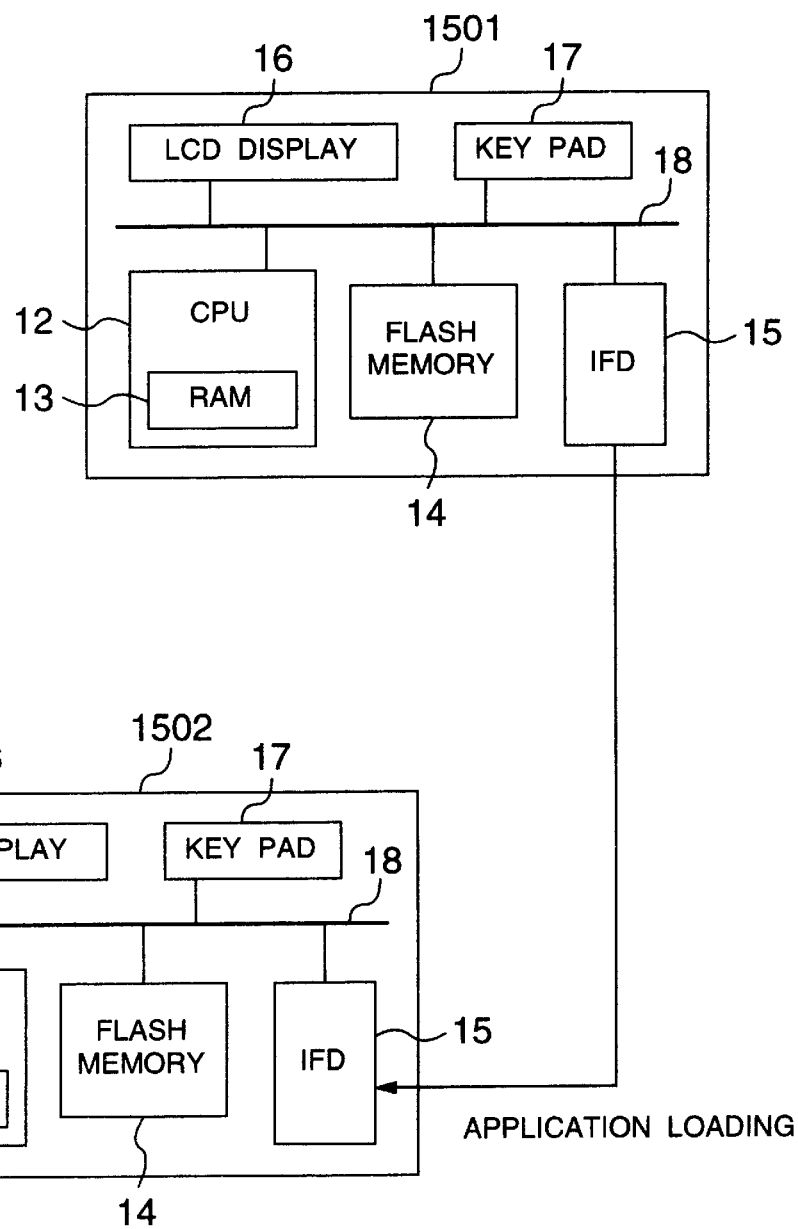
FIG. 15 is a block diagram showing a system configuration for loading an application program from a terminal device.

FIG. 15 shows an example of a system configuration for loading an application program from a terminal by applying the procedure in FIG. 13. Both terminals 1501 and 1502 are identical to the earlier-described terminal 11. In this example, the application program is loaded from the terminal 1501 to the terminal 1502. A flash memory 14 in the terminal 1501 contains an application program of a format of the memory image for executable codes accompanied by relocation information in FIG. 12. A microcomputer 12 in the terminal 1501 executes the loading procedure shown in FIG. 13 to generate an application program that can be loaded directly. The terminal 1502 receives the application program from the terminal 1501 and writes it into its own flash memory 14.

There are many methods for connecting terminals. In the example shown in FIG. 15, the slots for IC cards are utilized for communication between terminals. Communication connectors for loading may be provided separately. Application programs can be loaded by infrared communication or radio communication.

The above-mentioned processes and steps according to the present invention can be embodied in computer software programs, including computer readable media, such as a CD-ROM and a floppy disk.

According to the above-mentioned embodiment, a program can be loaded or executed in a system without memory resources sufficient to load a relative address format file into the memory (memory 13 in FIGS. 1 and 15).

What is claimed is:

1. A method of loading a program comprising the steps of:
    when reading a sequentially transformable relative address format program, including a set of records each record having an instruction and instruction relocation information corresponding to said instruction, sequentially relocating instructions by reading said records of said sequentially transformable relative address format program one by one to thereby generate an absolute address format program.

2. A method according to claim 1, further comprising the step of mapping said absolute address format program, which has been generated, on a memory.

3. A method according to claim 1, wherein said sequentially transformable relative address format program contains a header including access permission information, and if said access permission information is satisfied, instructions are relocated sequentially by reading said records one by one to generate said absolute address format program.

4. A method according to claim 1, wherein said sequentially transformable relative address format program is stored in an IC card, and when loaded into memory, said records of said sequentially transformable relative address format program are read one by one from said IC card for sequential relocation to generate said absolute address format program.

5. A method of loading a program comprising the steps of:
    transforming a first relative address format program including an instruction string and relocation information into a second relative address format program including a set of records each record having an instruction and instruction relocation information corresponding to said instruction; and
    sequentially relocating instructions by reading said records of said second relative address format program one by one to thereby generate an absolute address format program.

6. A method according to claim 5, further comprising the step of storing a header having an access permission condition set therein said second relative address format program, and when said access permission condition is satisfied, said instructions are relocated sequentially by reading said records of said second relative address format program one by one to generate said absolute address format program.

7. A method according to claim 5, further comprising the step of storing a header having attributes information set therein said second relative address format program.

8. A method according to claim 5, further comprising the step of storing said second relative address format program in at least one IC card, wherein said second relative address format program is loaded into memory by sequentially relocating said instructions and reading said records of said second relative address format program one by one from said IC card.

9. A method of loading a program comprising the steps of:
    transforming a first relative address format program including an instruction string and relocation information into a second relative address format program including a set of records each record having an instruction and instruction relocation information corresponding to said instruction;
    dividing said second relative address format program into a plurality of storage units; and
    storing said plurality of storage units in storage media.

10. A method according to claim 9, further comprising the step of sequentially relocating instructions by reading said records of said second relative address format program one by one to thereby generate an absolute address format program.

11. A method according to claim 10, further comprising the step of mapping said absolute address format program, which has been generated, on a memory.

12. A method of loading a program comprising the steps of:
    transforming a first address format program including an instruction string and relocation information into a second relative address format program including a set of records each record having an instruction and instruction relocation information corresponding to said instruction;

dividing said second relative address format program into a plurality of storage units;

providing each storage unit with a header having set therein relocation information; and loading said plurality of storage units on a memory by reading said storage units in an optional sequence, and sequentially relocating said instructions by reading said records of said second relative address format program one by one according to relocation information in the header of each storage unit that has been loaded.

13. A method of loading a program comprising the steps of:

when reading a sequentially transformable relative address format program, including a set of encrypted records each encrypted record having an instruction and instruction relocation information corresponding to said instruction, sequentially relocating instructions by reading and decrypting said encrypted records of said sequentially transformable relative address format program one by one to thereby generate an absolute address format program.

14. A method according to claim 13, wherein said sequentially transformable relative address format program contains a header including access permission information, and if said access permission information is satisfied, instructions are relocated sequentially by reading said records one by one to generate said absolute address format program.

15. A method according to claim 13, wherein said sequentially transformable relative address format program is stored in an IC card, and when loaded into memory, said records of said sequentially transformable relative address format program are read one by one from said IC card for sequential relocation to generate said absolute address format program.

16. A method of loading a program comprising the steps of:

transforming a first relative address format program including an instruction string and relocation information into a second relative address format program including a set of records having a group of instructions including instruction relocation information and at least one instruction corresponding to said relocation information; and sequentially relocating instructions by reading said records of said second relative address format program one by one to thereby generate an absolute address format program.

17. A method according to claim 16, wherein said second relative address format program contains a header including access permission information, and if said access permission information is satisfied, instructions are relocated sequentially by reading said records one by one to generate said absolute address format program.

18. A method according to claim 16, wherein said sequentially transformable relative address format program is stored in an IC card, and when loaded into memory, said records of said sequentially transformable relative address format program are read one by one from said IC card for sequential relocation to generate said absolute address format program.

19. A computer software product including a computer readable medium, said computer readable medium having stored thereon:

a first code section for holding a sequentially transformable relative address format program including a set of records each record having an instruction and instruction relocation information corresponding to said instruction, and for having said relative address format program read into a computer; and a second code section for generating an absolute address format program by sequentially relocating instructions and reading said records of said relative address format program one by one.

20. A computer software product according to claim 19, wherein said computer readable medium is further stored thereon:

a third code section for loading said absolute address format program, which has been generated, on a memory.

21. A computer software product including a computer readable medium, said computer readable medium having stored thereon:

a code section for transforming a first address format program including an instruction string and relocation information into a second relative address format program including a set of records each record having an instruction and instruction relocation information corresponding to said instruction; and a code section for generating an absolute address format program by sequentially relocating instructions and reading said records of said second relative address format program one by one.

22. A computer software product according to claim 21, wherein said computer readable medium is further stored thereon a code section for storing a header having an access permission condition set therein said second relative address format program, and when said access permission condition is satisfied, said instructions are sequentially relocated by reading said records of said second relative address format program one by one to generate said absolute address format program.

23. A computer software product according to claim 21, wherein said computer readable medium is further stored thereon a code section for storing a header having attributes information set therein said second relative address format program.

24. A computer software product according to claim 21, wherein said computer readable medium is further stored thereon:

a code section for transforming a first relative address format program including an instruction string and relocation information into a second relative address format program including a set of records having a group of instructions including instruction relocation information and at least one instruction corresponding to said relocation information; and a code section for generating an absolute address format program by sequentially relocating instructions and reading said records of said second relative address format program one by one.

25. A computer software product according to claim 21, wherein said computer readable medium is further stored thereon:

a code section for storing said second relative address format program in at least one IC card, wherein said second relative address format program is loaded into memory to generate an absolute address format program by sequentially relocating instructions and reading said records of said second relative address format program one by one from said IC card.

26. A computer software product including a computer readable medium, said computer readable medium having stored thereon:

a code section for transforming a first address format program including an instruction string and relocation information into a second relative address format program including a set of records each record having an instruction and instruction relocation information corresponding to said instruction; and a code section for dividing said second relative address format program into a plurality of storage units, and storing said storage units into corresponding recording media.

27. A computer software product according to claim 26, wherein said computer readable medium is further stored thereon:

a code section for generating an absolute address program by sequentially relocating instructions and reading said records of said second relative address format program one by one in each storage unit.

28. A computer software product according to claim 27, wherein said computer readable medium is further stored thereon:

a code section for loading said absolute address format program, which has been generated, on a memory.

29. A computer software product including a computer readable medium, said computer readable medium having stored thereon:

a code section for transforming a first relative address format program including an instruction string and relocation information into a second relative address format program including a set of records each record having an instruction and instruction relocation information corresponding to said instruction; and a code section for dividing said second relative address format program into a plurality of storage units, and providing each storage unit with a header having set therein relocation information of each storage unit; and a code section for loading said storage units on a memory by reading said storage units in an optional sequence, and sequentially relocating instructions by reading said records of said second relative address format program one by one according to relocation information in the header of each storage unit that has been loaded.

30. A computer software product including a computer readable medium, said computer readable medium having stored thereon:

a code section for holding a sequentially transformable relative address format program including a set of records each record having an instruction and instruction relocation information corresponding to said instruction, and for having said relative address format program loaded into a computer;

a code section for encrypting said relative address format program that has been loaded into said computer; and a code section for decrypting an encrypted relative address format program while sequentially relocating instructions by reading said records of said encrypted relative address format program one by one to thereby generate an absolute address format program.

* * * * *